United States Patent
Yamada

(10) Patent No.: US 8,074,180 B2
(45) Date of Patent: Dec. 6, 2011

(54) INFORMATION PROCESSING APPARATUS AND PROGRAM PRODUCT

(75) Inventor: Kazutaka Yamada, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 952 days.

(21) Appl. No.: 11/277,495

(22) Filed: Mar. 25, 2006

(65) Prior Publication Data

US 2006/0221416 A1 Oct. 5, 2006

(30) Foreign Application Priority Data

Mar. 30, 2005 (JP) ................. 2005-099259

(51) Int. Cl.
| | |
|---|---|
| G03F 3/10 | (2006.01) |
| G06F 3/048 | (2006.01) |
| G06F 3/12 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06K 15/00 | (2006.01) |

(52) U.S. Cl. ........ 715/781; 715/269; 715/273; 715/274; 715/783; 715/838; 358/1.15; 358/1.18; 358/527

(58) Field of Classification Search ........................ None
See application file for complete search history.

(56) References Cited

U.S. PATENT DOCUMENTS

| | | | |
|---|---|---|---|
| 5,748,342 A | 5/1998 | Usami | |
| 6,947,158 B1 | 9/2005 | Kitamura et al. | |
| 7,301,656 B1 * | 11/2007 | Nakagiri et al. | 358/1.15 |
| 2003/0011802 A1 | 1/2003 | Nakagiri et al. | |
| 2003/0117440 A1 * | 6/2003 | Hellyar et al. | 345/767 |
| 2004/0066414 A1 * | 4/2004 | Czerwinski et al. | 345/781 |
| 2005/0223323 A1 * | 10/2005 | Tanaka et al. | 715/526 |
| 2006/0061805 A1 * | 3/2006 | Kawamura | 358/1.15 |

FOREIGN PATENT DOCUMENTS

| | | |
|---|---|---|
| CN | 1397430 | 2/2003 |
| JP | H08-009179 A | 1/1996 |

(Continued)

OTHER PUBLICATIONS

Japan Patent Office, Office Action in corresponding Japanese Patent Application No. 2005-099259 dated Jul. 29, 2008.
State Intellectual Property Office, Notice of the Second Office Action for Chinese Patent Application No. 200610066127.9 (counterpart to the above-captioned U.S. patent application), dated Feb. 1, 2008.

*Primary Examiner* — Benny Tieu
*Assistant Examiner* — Fan Zhang
(74) *Attorney, Agent, or Firm* — Baker Botts L.L.P.

(57) ABSTRACT

When a print instruction is input, an information processing apparatus of the invention converts designated data to print data appropriate for print setting information of a designated printing device, inputs the print data to the printing device, and forms an image based on the designated data through the designated printing device. On the other hand, when an instruction to display a preview screen is input, the designated data is converted to print data appropriate for the print setting information of the designated printing device and a preview screen GP1 based on the print data is displayed.

9 Claims, 13 Drawing Sheets

FOREIGN PATENT DOCUMENTS

| | | |
|---|---|---|
| JP | H10-269048 A | 10/1998 |
| JP | 1999-11203099 A1 | 7/1999 |
| JP | 2000-222156 A | 8/2000 |
| JP | 2004-348405 A | 12/2004 |

* cited by examiner

FIG. 7

(WINDOW MANAGEMENT TABLE)

| WINDOW HANDLE | WINDOW TITLE | PATH INFORMATION | FILE INFORMATION | WINDOW BUTTON ID |
|---|---|---|---|---|
| ***** | D1-APPLICATION A | c:¥aprA¥aprA.exe | c:¥aprA¥data¥D1.* | 001 |
| ***** | D2-APPLICATION A | c:¥aprA¥aprA.exe | c:¥aprA¥data¥D2.* | 002 |
| ***** | D3-APPLICATION A | c:¥aprA¥aprA.exe | c:¥aprA¥data¥D3.* | 003 |
| ***** | D6-APPLICATION C | c:¥aprC¥aprC.exe | c:¥aprC¥data¥D6.* | 004 |

FIG. 8

(REGISTERED APPLICATION MANAGEMENT TABLE)

| NAME OF APPLICATION | IDENTIFICATION INFORMATION ON APPLICATION |
|---|---|
| APPLICATION A | ***** |
| APPLICATION C | ***** |

INFORMATION PROCESSING APPARATUS AND PROGRAM PRODUCT

CROSS REFERENCE TO RELATED APPLICATION

This application claims priority from Japanese Patent Application No. 2005-099259 filed on Mar. 30, 2005, the entire subject matter of which is incorporated herein by reference.

TECHNICAL FIELD

The present invention may relate to an information processing apparatus and a program product having a print preview function.

BACKGROUND

An information processing apparatus having a print preview function has been widely known as a conventional information processing apparatus. The print preview function is a function of displaying an image showing a print output result on a display device to allow a user to check the image of data, which will be printed out by a printing device, before the print is output.

In the information processing apparatus having the print preview function, for example, when a user instructs the information processing apparatus to execute the print preview function by manipulating an input device, such as a keyboard or a pointing device, a program which is installed in application software so as to execute the print preview function is executed, and an image showing a print output result with respect to data dealt with by the application software is displayed on a display device.

In addition, there is known an information processing apparatus in which a plurality of pages of preview images are generated so as to be disposed in parallel to one another and the preview images are displayed on a display device (for example, see JP-A-11-203099).

However, it is not convenient when the conventional information processing apparatus can use a plurality of types of printing devices having different functions. That is, the conventional information processing apparatus does not have a function that allows a user to compare print output results of respective printing devices. Accordingly, when the user desires to compare the print output results of the respective printing devices so as to decide a proper printing device, the user should repeatedly perform an operation of designating a printing device and executing a print preview function in the information processing apparatus, displays the print output results of the respective printing devices on the display device such that the print output results switch to one another, and memorize each of the print output results so as to compare the print output results.

In addition, even though the print output results vary according to the setting conditions (for example, page layout, the size of a paper, the direction of a paper, and the resolution), the conventional information processing apparatus does not have a function that allows a user to compare print output results with respect to the respective setting conditions. Accordingly, when the user desires to compare the print output results for the respective setting conditions so as to decide a proper printing method, the user should change the setting condition and repeatedly perform an operation of executing a print preview function in the information processing apparatus, displays the print output results for the respective setting conditions on the display device such that the print output results switch to one another, and memorize each of the print output results so as to compare the print output results.

SUMMARY

One aspect of the present invention may provide an information processing apparatus that, with respect to one data, allows a user to easily compare print output results under different conditions through a display device.

An information processing apparatus having a print preview function, may include: an operation unit that allows a user to input instructions; a print processing unit that controls a printing device to print an image based on data and printing method that are designated with a print instruction that is input through the operation unit; a first image data generating unit that generates a first print preview image data that shows a print output result obtained when the print processing unit controls the printing device to print an image based on data and a first printing method that are designated with a preview instruction that is input through the operation unit for performing the print preview function; a first preview unit that displays, on a display device, an image based on the first print preview image data; a second image data generating unit that generates a second print preview image data that shows a print output result obtained when the print processing unit controls the printing device to print an image based on the data designated with the preview instruction, and based on a second printing method designated with a method change instruction that is input through the operation unit; and a second preview unit that displays, on the display device, an image based on the second print preview image data in parallel to the image based on the first print preview image data.

An information processing apparatus having a print preview function, may include: an operation unit that allows a user to input instructions; a print processing unit that controls a printing device designated with a print instruction to print an image based on data designated with the print instruction, the print instruction being input through the operation unit; a first image data generating unit that generates a first print preview image data that shows a print output result obtained when the print processing unit controls a first printing device designated with a print-preview instruction to print an image based on data designated with the print-preview instruction, the print-preview instruction being input through the operation unit for performing the print preview function; a first preview unit that displays, on a display device, an image based on the first print preview image data; a second image data generating unit that generates a second print preview image data that shows a print output result obtained when the print processing unit controls a second printing device designated with a device-change instruction to print an image based on the data designated with the print-preview instruction, the device-change instruction being input through the operating unit for changing the printing device from the first printing device to the second printing device; and a second preview unit that displays, on the display device, an image based on the second print preview image data in parallel to the image based on the first print preview image data.

A computer-readable program product causes a computer having a print processing unit that controls a printing device to print an image based on data and printing method that are designated with a print instruction, to perform procedures. The procedures may include: generating a first print preview image data that shows a print output result obtained when the print processing unit controls the printing device to print an image based on data and a first printing method that are designated with a print-preview instruction; displaying, on a display device, an image based on the first print preview image data; generating a second print preview image data that shows a print output result obtained when the print processing unit controls the printing device to print an image based on the data designated with the preview instruction, and based on a second printing method designated with a method-change instruction; and displaying, on the display device, an image based on the second print preview image data in parallel to the image based on the first print preview image data.

A computer-readable program product causes a computer having a print processing unit that controls a printing device designated with the print instruction to print an image based on data designated a the print instruction, to perform procedures. The procedures may include: generating a first print preview image data that shows a print output result obtained when the print processing unit controls a first printing device designated with a print-preview instruction to print an image based on data designated with the print-preview instruction; displaying, on a display device, an image based on the first print preview image data; generating a second print preview image data that shows a print output result obtained when the print processing unit controls a second printing device designated with a device-change instruction to print an image based on the data designated with the print-preview instruction; and displaying, on the display device, an image based on the second print preview image data in parallel to the image based on the first print preview image data.

BRIEF DESCRIPTION OF THE DRAWINGS

In the accompanying drawings:

FIG. 7 is an explanatory view illustrating the configuration of a window management table;

FIG. 8 is an explanatory view illustrating the configuration of a registered application management table;

DETAILED DESCRIPTION

An illustrative aspect of the present invention will be described hereinbelow by reference to the drawings.

Figure 1:
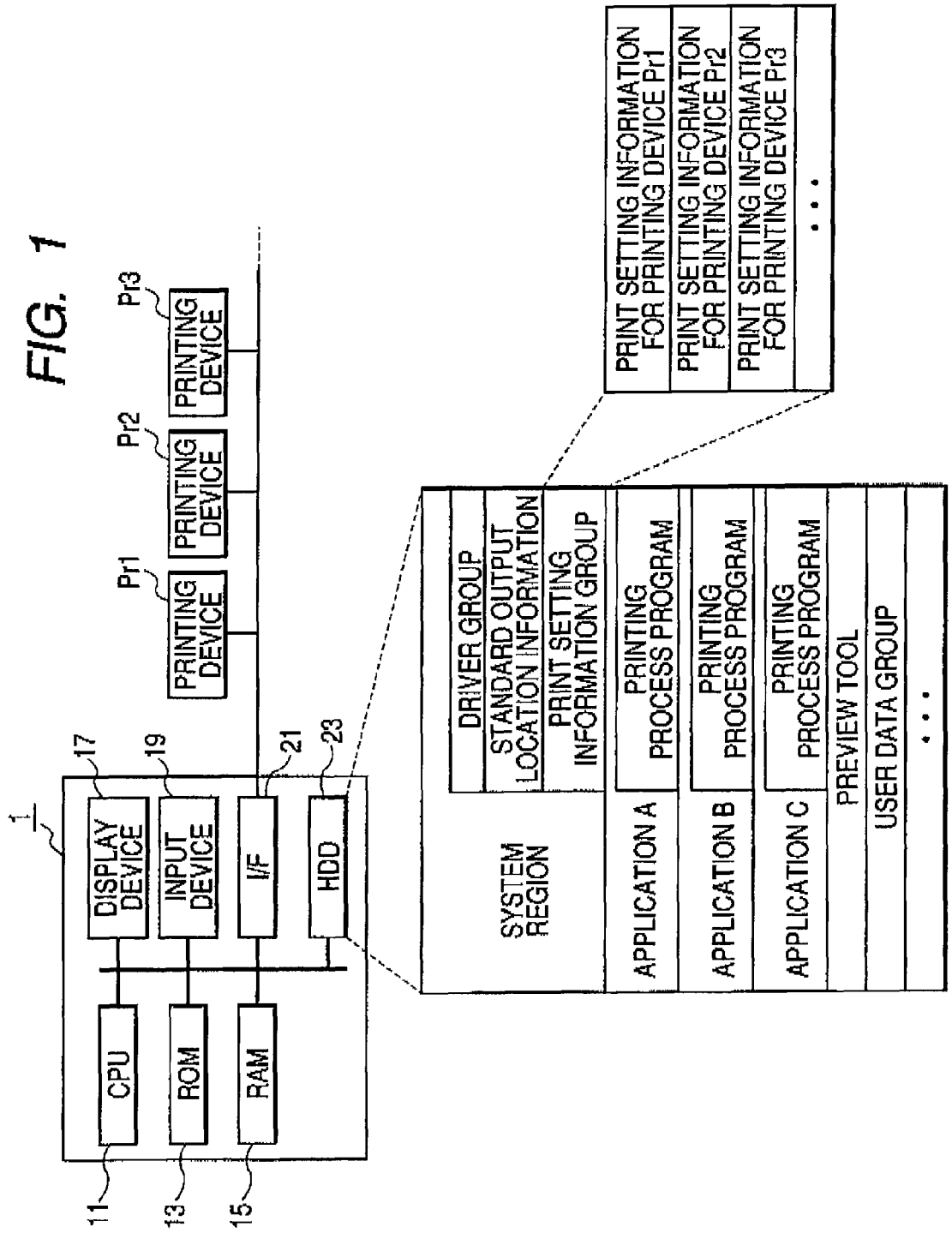
FIG. 1 is an explanatory view illustrating the configuration of an information processing apparatus.

FIG. 1 is an explanatory view illustrating the configuration of an information processing apparatus 1 according to the illustrative aspect of the present invention.

The information processing apparatus 1 is configured in the same manner as a well-known personal computer, and includes a CPU 11 that performs various operations according to a program, a ROM 13 that stores a boot program or the like, a RAM 15 used as an operation region when a program is executed by the CPU 11, a display device 17 that includes, for example, a liquid crystal panel so as to display various information, an input device 19, such as a keyboard or a pointing device, which a user can operate, an interface 21 that is communicably connected to a plurality of printing devices (printers) Pr1, Pr2, and Pr3, and a hard disc device 23 that stores a program, data, or the like.

The information processing apparatus 1 is operated by a multi-task OS (operating system). On a system region of the hard disc device 23, a data group or a program group that allows the CPU 11 to perform a function of the multi-task OS is stored. On the system region, a driver program for controlling the printing devices PF1, Pr2, and Pr3 is stored so as to correspond to a type of a printing device, print setting information which is setting information on a printing method is stored for each of the printing devices Pr1, Pr2, and Pr3 connected to the information processing apparatus 1. In addition, on the system region, standard output location information representing a standard output location printing device, which is designated by a user through the input device 19, is stored.

In addition, a plurality of kinds of application software executed under the multi-task OS are stored in the hard disc device 23. Specifically, as one application software, a program (preview tool) that allows the CPU 11 to perform functions of the invention is stored in the hard disc device 23. In addition, user data (document file) that a task based on the various application software has generated according to input information of a user is stored in the hard disc device 23.

Figure 2:
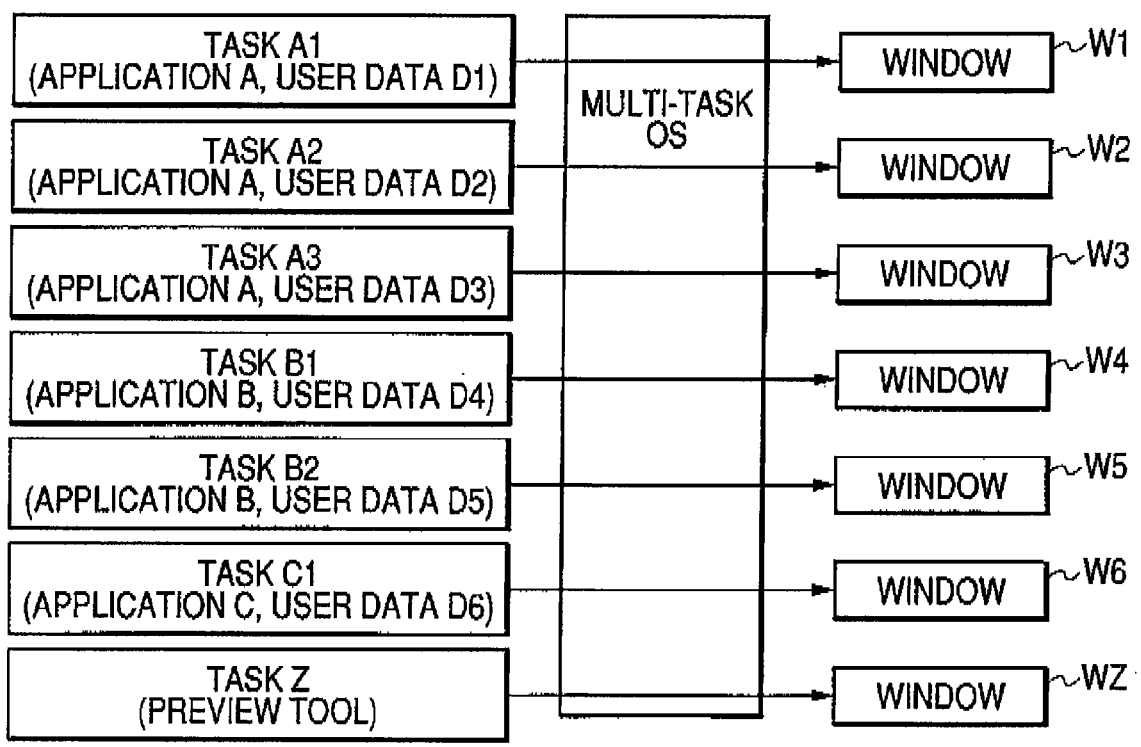
FIG. 2 is an explanatory view illustrating an operation of a multi-task OS.

FIG. 2 is an explanatory view illustrating an operation of the multi-task OS in the illustrative aspect. In the information processing apparatus 1 of the illustrative aspect, the CPU 11 executes a boot program stored in the ROM 13 when power is turned on, and then executes a program stored in the system region so as to drive the multi-task OS. As shown in FIG. 2, in a case in which the multi-task OS of the illustrative aspect is used, a plurality of windows for displaying information can be displayed on the display device 17. Specifically, application software instructed by a user is executed when the instruction of the user is input from the input device 19, a window is generated according to instruction of a task based on the application software, and the window is displayed on the display device 17 and an information display is performed within the window according to the instruction of the task.

Further, in the case of the multi-task OS of the illustrative aspect, it is possible to assign a plurality of windows for single application software (for example, Microsoft Windows (registered trademark)). For example, in the information processing apparatus 1 of the illustrative aspect, when a user instructs application software A, such as word processor software or drawing software, to be executed while designating user data D1, the multi-task OS sets the user data D1 to an argument and executes the application software A instructed by the user, thereby creating a task A1 based on the application software A dealing with the user data D1. In addition, when the task A1 instructs a window W1 to be generated the multi-task OS generates the new window W1 on the display device 17.

On the other hand, when the user instructs the application software A to be executed while designating user data D2, the multi-task OS sets the user data D2 to an argument and executes the application software A instructed by the user, thereby creating a task A2 based on the application software A dealing with the user data D2. In addition, when the task A2 instructs a window W2 to be generated, the multi-task OS generates the new window W2 on the display device 17.

Furthermore, a task, which is generated by the instruction (instruction to open a file) of a user to display data and is based on application software, such as word processor software or drawing software, performs a display process for user data instructed by the user so as to display information based on the user data D on the window generated by the multi-task OS.

In addition, each application software A, B, or C, such as word processor software or drawing software, has a printing process program for realizing a printing function. A task based on the application software A, B, or C displays, on the display device 17, a printing device setting dialogue through which an output-location printing device can be set, when a print instruction is input from a user through the windows W1 to W6, makes the user set the output-location printing device or a printing method, and performs a printing process for user data being displayed.

Figure 3:
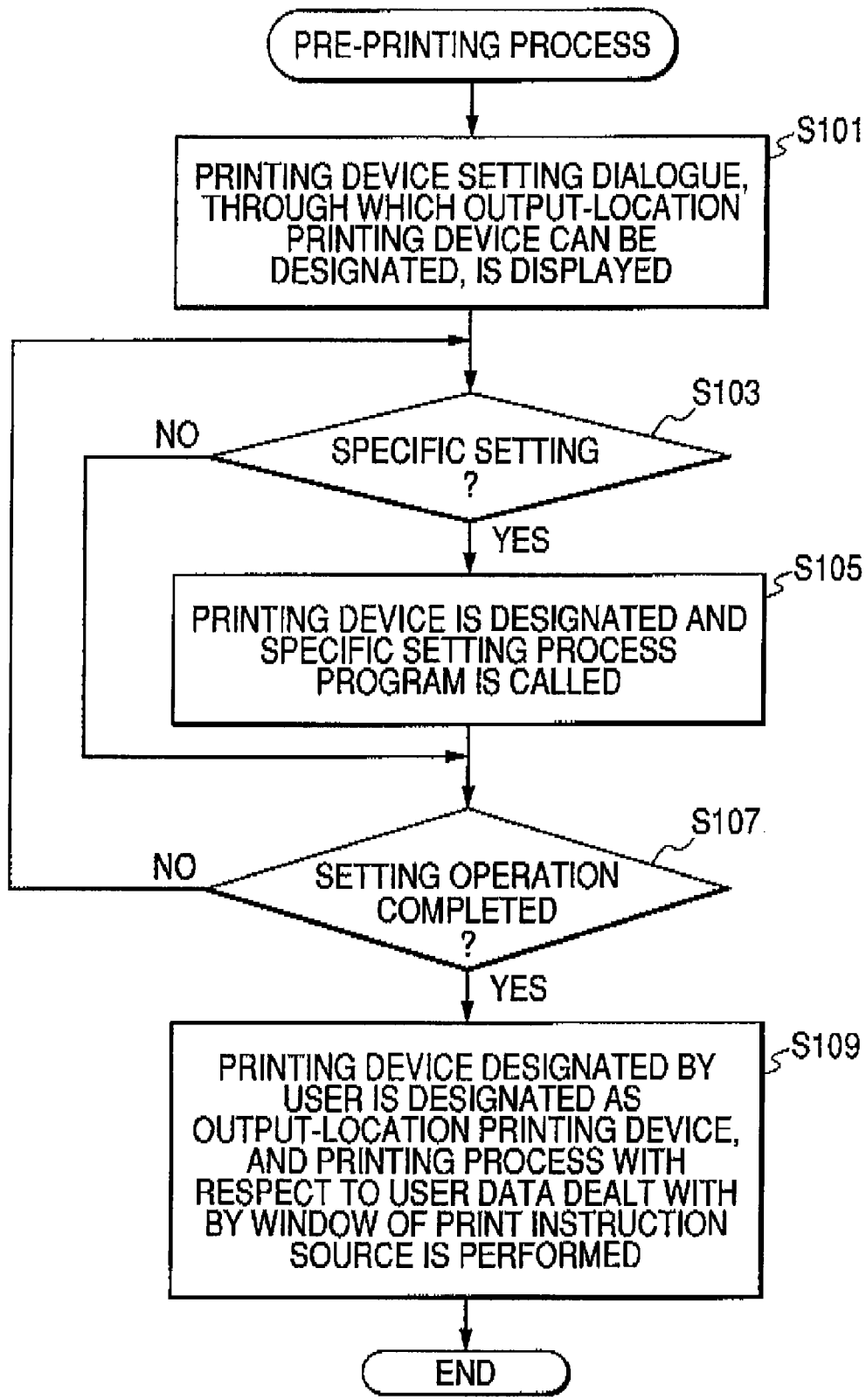
FIG. 3 is a flow chart illustrating a pre-printing process performed by a CPU.

FIG. 3 is a flow chart illustrating a pre-printing process performed by tasks A1 to A3, B1, B2, and C1 based on application software A, B, and C having the printing process program when the tasks A1 to A3, B1, B2, and C1 receive a print instruction from a user through the input device 19.

Each of the tasks A1 to A3, B1, 52, and C1 starts the pre-printing process shown in FIG. 3 when each of the tasks A1 to A3, B1, B2, and C1 receives the print instruction. First, each of the tasks A1 to A3, 31, B2, and C1 displays, on the display device 17, a printing device setting dialogue through which an output-location printing device can be set (S101). Thereafter, when the user has not input a display instruction on a specific setting dialogue through the printing device setting dialogue (No in a process S103), a setting operation of the user using the printing device setting dialogue is completed and each of the tasks A1 to A3, B1, 32, and C1 waits until the output-location printing device is set (S107).

On the other hand, when the user has input the display instruction on the specific setting dialogue (Yes in the process S103), the specific setting dialogue with respect to a printing device, which is temporarily set as an output-location printing device by the user at that timer is displayed. Accordingly, the printing device which is temporarily set is specified and a specific setting process program stored in the hard disc device 23 is called (S105).

Figure 4:
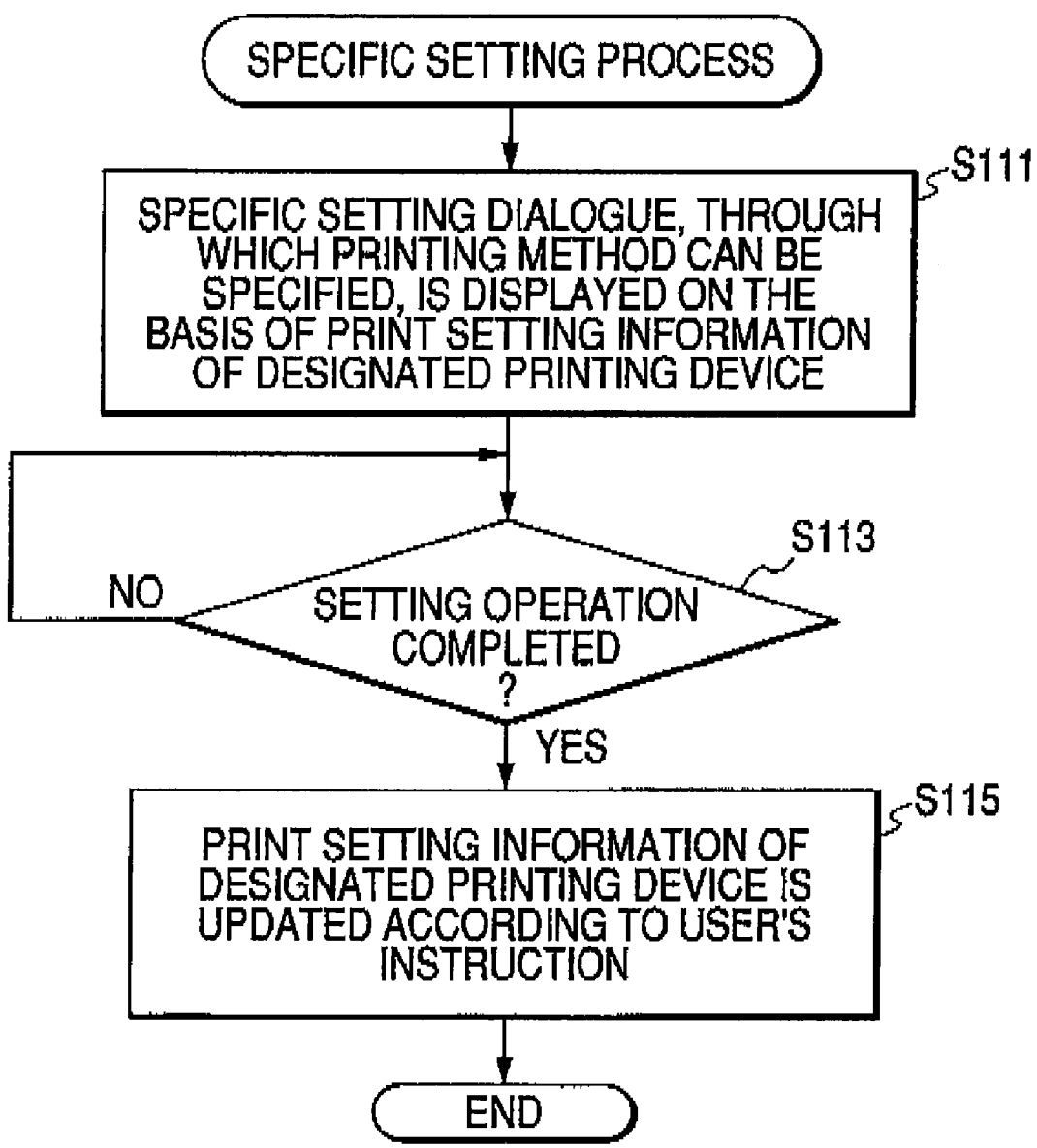
FIG. 4 is a flow chart illustrating a specific setting process performed by the CPU.

FIG. 4 is a flow chart illustrating a specific setting process performed by the specific setting process program. In the specific setting process, a specific setting dialogue, through which print setting information can be edited (that is, a printing method can be set) on the basis of print setting information of the designated printing device, is displayed on the display device 17 (S111), and when the user has completed the setting operation using the specific setting dialogue (Yes in a process S113), the print setting information of the designated printing device is updated according to the setting operation performed by the user and thus a setting on a printing method is changed (3115).

When the specific setting process performed by the CPU 11 is completed by calling the specific setting process program, a task which has received the print instruction proceeds to the process S107 in which it is determined whether or not the setting operation of the user using the printing device setting dialogue has been completed. If it is determined that the setting operation of the user using the printing device setting dialogue has not been completed, the process proceeds to the process S103. On the other hand, if it is determined that the setting operation of the user using the printing device setting dialogue has been completed, the process proceeds to the process S109.

In the process S109, the printing device designated by the user through the printing device setting dialogue is confirmed as an output-location printing device, a printing process program is called, and a printing process with respect to user data displayed on a window of a print instruction source is performed. Specifically, the user data to be printed out and the output-location printing device are designated, the printing process program is called, and the designated user data is printed out to the output-location printing device.

Figure 5:
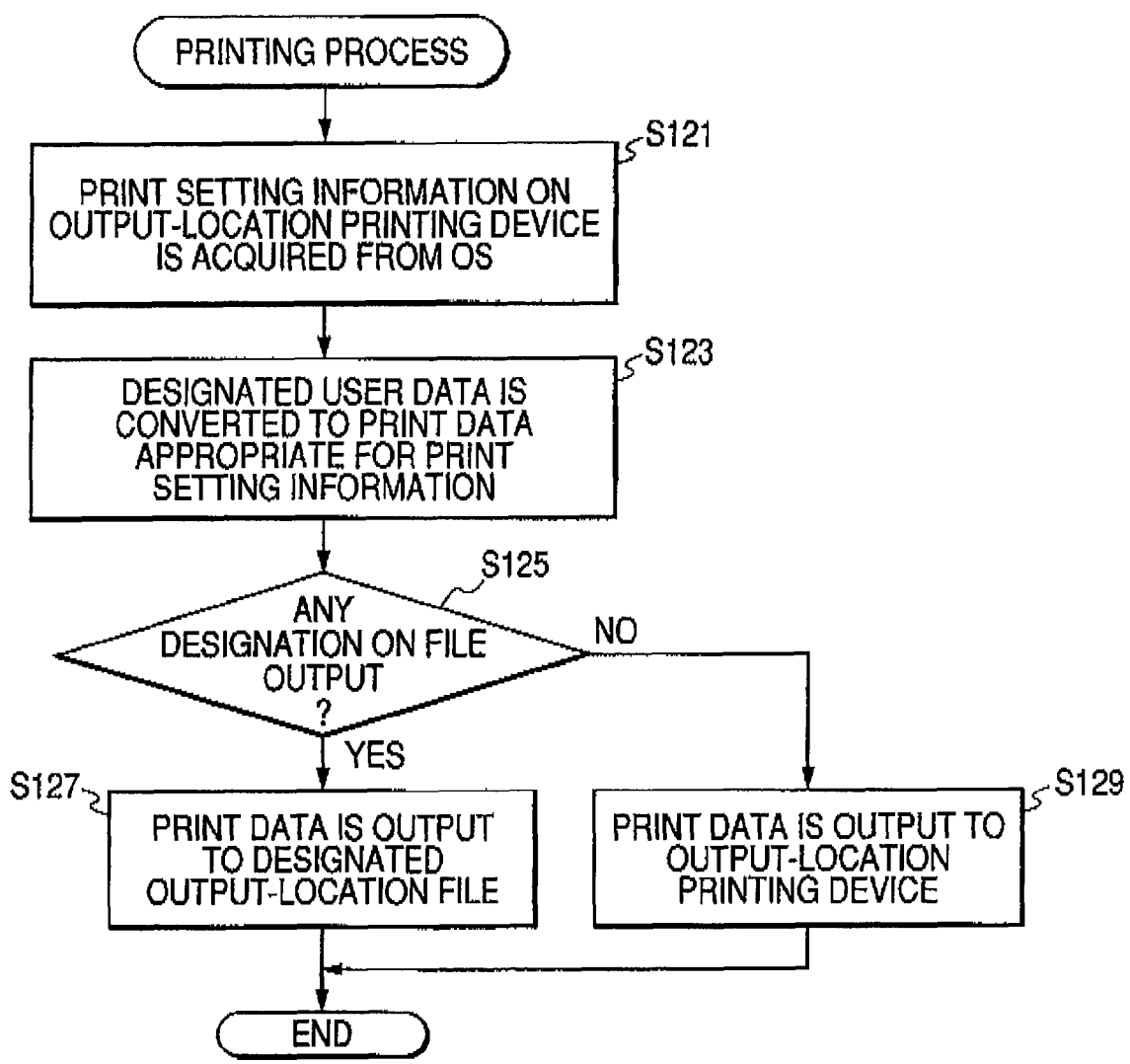
FIG. 5 is a flow chart illustrating a printing process performed by the CPU.

FIG. 5 is a flow chart illustrating a printing process executed by the printing process program. A task performing the printing process acquires print setting information on the designated output-location printing device from the multi-task OS (S121), and generates print data for printing out the user data, which is designated on the basis of the print setting information, to the output-location printing device in a printing method indicated by the print setting information (S123). For example, as information representing the printing method, the print setting information includes information on the page layout, information on the paper direction (orientation), information on the paper size, information on the resolution, and the like. Here, print data having the page layout, the paper direction size, the resolution represented by the print setting information are generated as the print data appropriate for the print setting information.

Subsequently, while the printing process is performed, it is determined whether or not a file output has been designated (S125). If it is determined that the file output has been designated (Yes in the process 125), print data is recorded in a designated output-location file (S127) and then the corresponding printing process is completed on the other hand, if it is determined that the file output has not been designated (No in the process 125), the print data is input to the designated output-location file, an image based on the print data is printed out by the output-location printing device (S129), and then, the corresponding printing process is completed. In addition, in the process S109, since the file output is not designated, the process S129 is performed and the image based on the designated user data is printed out by the output-location printing device.

Figure 6:
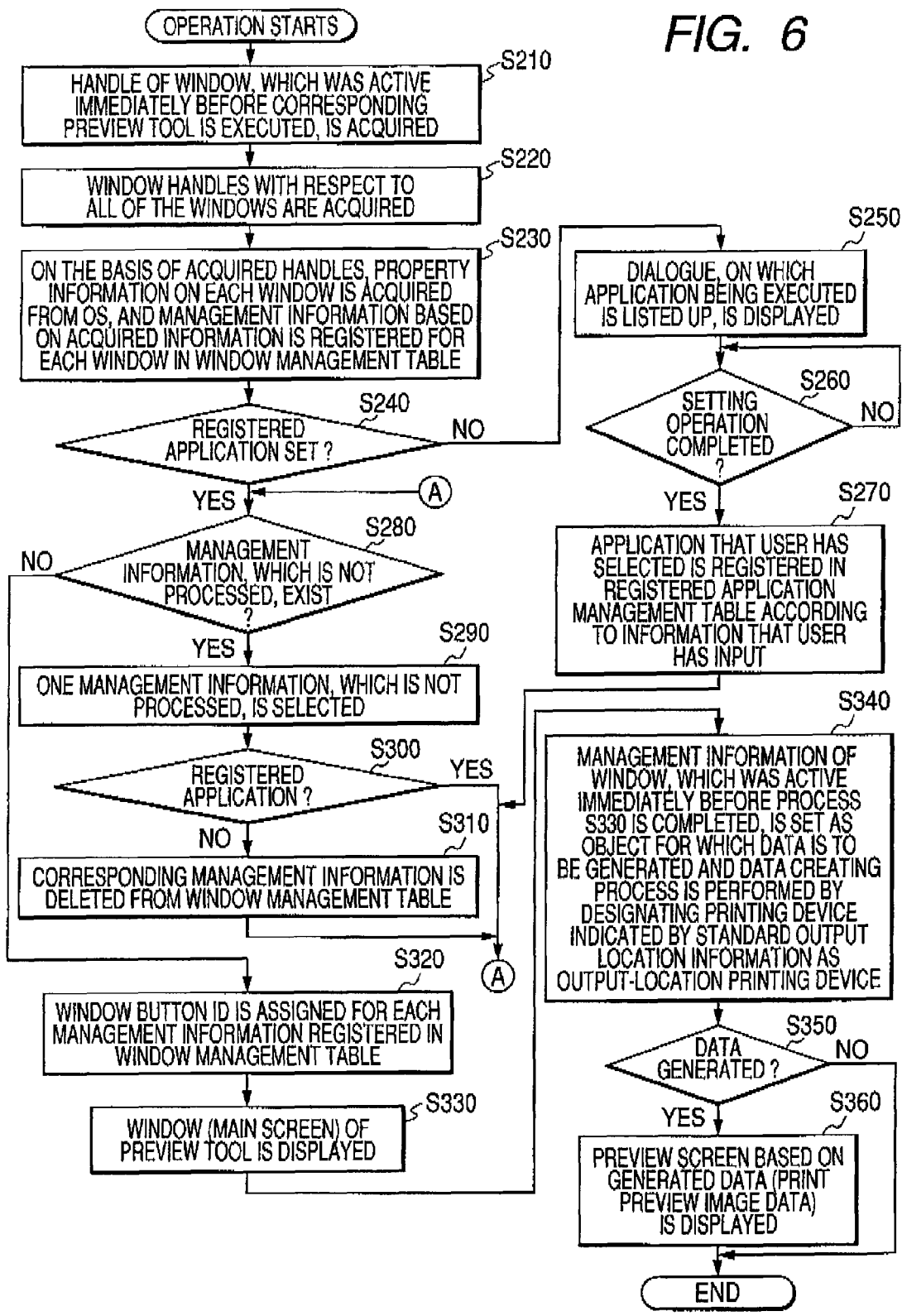
FIG. 6 is a flow chart illustrating an operation of the CPU.

Further, in the information processing apparatus 1 of the illustrative aspect, when a user's instruction to execute a preview tool is input from the input device 19, the preview tool stored in the hard disc device 23 is executed by the multi-task OS and a task Z (that is, CPU 11) performs an operation shown in FIG. 6. FIG. 6 is a flow chart illustrating the operation.

When the operation starts, the task Z inquires the multi-task OS of handle of a window which was active immediately before the preview tool is executed, and acquires the handle (window handle) with respect to the active window (S210). In addition, the task Z inquires the multi-task OS of handle (window handle) with respect to all of the generated windows, and acquires the information (handle with respect to all of the generated windows) (S220). In addition, the window handle serves as identification information on a window.

When the process S220 is completed, the task Z acquires property information on all of the generated windows on the basis of the window handle acquired in the process S220 (S230). Specifically, the task Z designates window handle for each window and inquires the multi-task OS of the characteristic of a window corresponding to the window handle, thereby acquiring the property information on each window from the multi-task OS.

Further, in the illustrative aspect, as the property information, window title information representing a title of a window, path information of an execution module (that is, an execution file of application software) corresponding to a window, and information on user data which is displayed (that is, opened) on the window by a task based on the execution module.

Then, on the basis of the acquired property information on each window, management information on each of the generated windows is registered in a window management table stored in the RAM 15 (5230).

FIG. 7 is an explanatory view illustrating the configuration of the window management table. As shown in FIG. 7, in the window management table, management information, which includes window handle with respect to each window, window title information, path information of an execution module, information (file information) on user data which is displayed on the window, and a window button ID to be described below, is registered for each window. In addition, in the process S230, the window button ID is registered as empty information.

When the process 9230 is completed, in a process S240, the task Z determines whether or not application software is registered in a registered application management table stored in the hard disc device 23. FIG. 8 is an explanatory view illustrating the configuration of the registered application management table. As shown in FIG. 8, in the registered application management table, registered application information which is composed of a name of application software and identification information (specifically, path information of an execution module) on the application software, is registered as registered information on the application software for each application software.

When determined that the application software is not registered (that is, the registered application management table is empty) in the registered application management table in the process S240, the task Z displays a dialogue (not shown), on which application software being executed is listed up, on the display device 17 (S250). On the dialogue displayed in the process 3250, for example, a name of the application software being executed is displayed. In addition, through the dialogue, it is possible to designate application software that a user wants to register.

When the process S250 is completed, the task Z waits until a user completes a setting operation based on the dialogue (S260) Then, if it is determined that the setting operation in the process S260 has been completed, the task Z registers registered application information with respect to application software, which has been selected by the user, in the registered application management information (S270). In addition, the registered application information is generated on the basis of property information on the window acquired from the process S230.

When the process S270 is completed, or when determined that application software is registered in the registered application management table in the process S240, the task Z proceeds to a process S280 so as to determine whether or not management information, which is not processed in a process S290, is registered in the window management table.

Then, when determined that there is the management information which is not processed (Yes in the process S280), the task Z proceeds to the process S290 in which one management information which is not processed is selected from the window management table. Then, it is determined whether or not a window corresponding to the selected management information is a window corresponding to the registered application software on the basis of path information included in management information and identification information (path information) of application software registered in the registered application management table (S300).

Subsequently, when determined that the window corresponding to the selected management information is not a window corresponding to the registered application software (No in the process S300), the management information selected from the window management table is deleted (S310), proceeding to the process S280.

On the other hand, when determined the window corresponding to the selected management information is a window corresponding to the registered application software (Yes in the process S300), the process S310 is not performed, proceeding to the process S280 under a state in which the management information is held in the window management table. Then, if a process subsequent to the process S290 is performed for all of the management information registered on the window management table, No is determined in the process 8280, proceeding to a process S320.

In such processes, only the management information corresponding to the window of the application software registered in the registered application management table is held in the window management table. For example, at a time when a preview tool is executed, the windows W1 to W6 are displayed on the display device 17 as shown in FIG. 2, the management information corresponding to the windows W4 and W5 corresponding to the application software B is deleted from the window management table if only the application software A and the application software C are registered in the registered application management table, and only the management information corresponding to the windows corresponding to the application software A and the application software C are held in the window management table at a point of time proceeding to the process S320 as shown in FIG. 7.

In the process S320, for each management information registered in the window management table, the task Z assigns a unique window button ID, adds information on the assigned window button ID to management information corresponding thereto, and updates each management information stored in the window management table. In addition, the window button ID is provided to associate a window button displayed on the main screen GM (refer to FIG. 9) with the management information. Since the unique window button ID is assigned for each management information in the process S320, each management information (that is, each window) corresponds to one of the window buttons displayed on the main screen GM, respectively.

When the process S320 is completed, the task Z instructs the multi-task OS to create a window WZ, displays the window WZ for a preview tool on the display device 17, and displays the main screen GM on which window buttons are arranged in the order of ID on the right side of the window WZ (S330).

Figure 9:
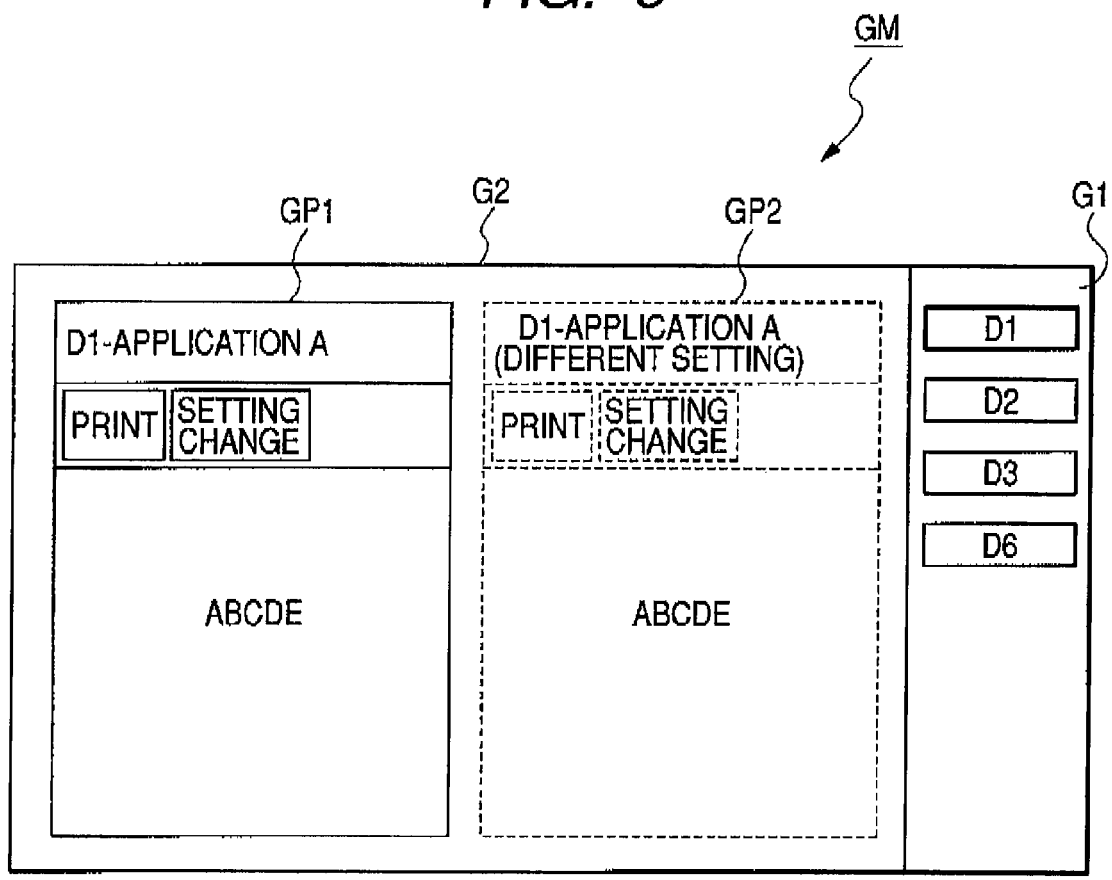
FIG. 9 is an explanatory view illustrating the configuration of a main screen.

FIG. 9 is an explanatory view illustrating the configuration of the main screen GM. As shown in FIG. 9, a window button display screen G1 is disposed on the right side of the main screen GM, and an application button display screen G2 for preview screens GP1 and GP2 is disposed on the left side of the main screen GM.

In the process S330, the task Z arranges window buttons corresponding to the respective window button IDs on the display screen G1 in the order of ID and displays, on each window button, a character string included in window title information of the management information assigned with the window button ID. In addition, the entire character string included in the window title information or a part of the character string may be display on a window button. For example, since a character string included in window tile information is long when the name of user data and the title of application software are included in a window title, it is preferable to display only the name of the user data on the window button.

Figure 10:
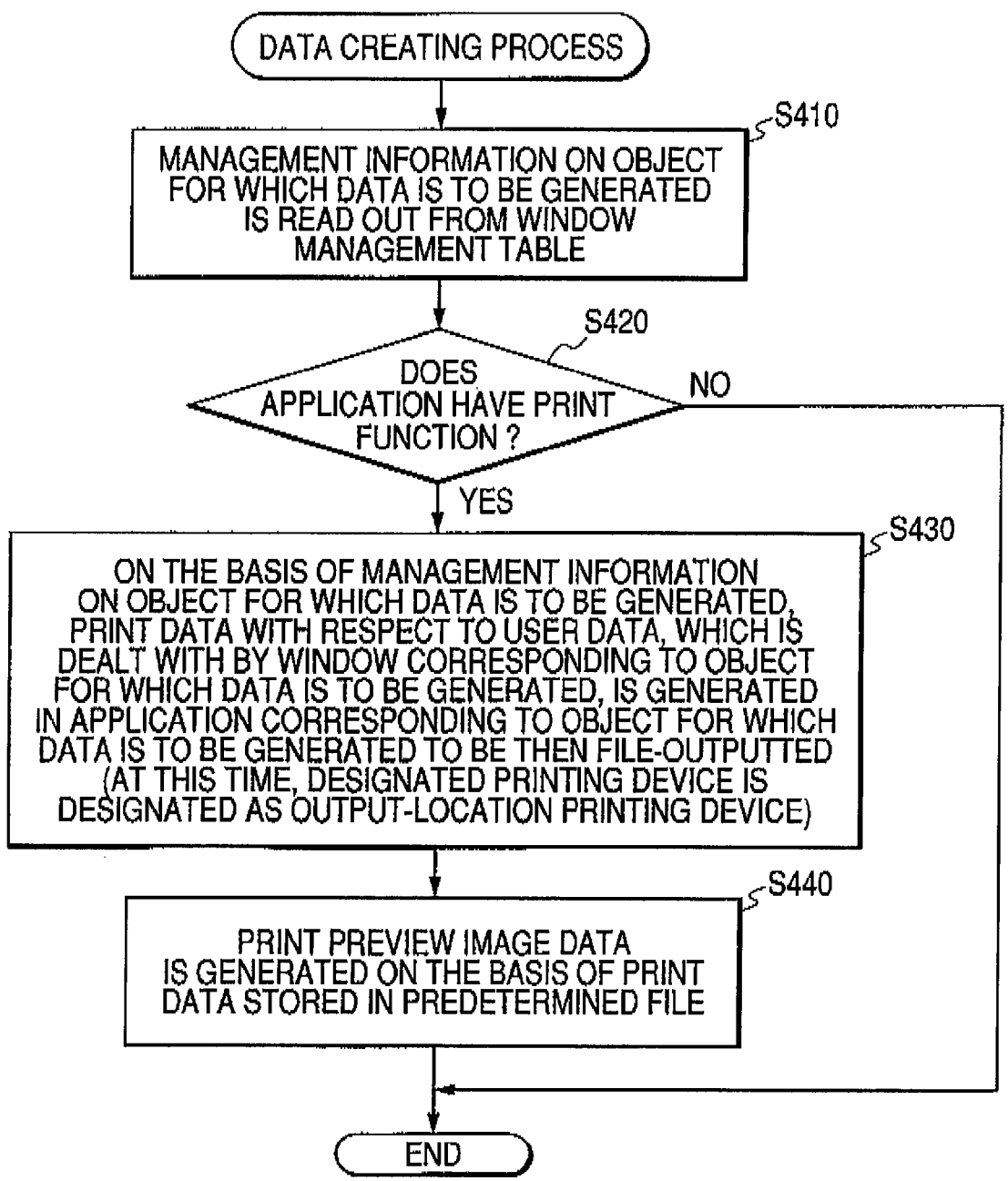
FIG. 10 is a flow chart illustrating a data creating process performed by the CPU.

When the process S330 is completed, on the basis of the window handle acquired in the process S210, the task z sets management information on a window, which was active immediately before the process S330 is completed, to an object (object for which data is to be generated) for which print preview image data is to be generated, designates, to an output-location printing device, a printing device (for example, the printing device Pr1) indicated by standard output-location information stored in the system region among the plurality of printing devices Pr1, Pr2, and Pr3 connected to the interface 21, and performs a data creating process shown in FIG. 10 (S340). FIG. 10 is a flow chart illustrating the data creating process performed by the task Z.

When the data creating process is performed, the task Z reads out management information on an object for which data is to be generated from the window management table (S410), determines application software corresponding to the object for which data is to be generated on the basis of the management information and determines whether or not the application software has a print function (S420) On the other hand, when determined that the application software corresponding to the object for which data is to be generated does not have the print function (No in the process S420), the process of creating the corresponding data is completed without creating the print preview image data.

On the other hand, when determined that the application software corresponding to the object for which data is to be generated has the print function (Yes in the process S420), the task Z proceeds to a process S430 in which, on the basis of the management information on the object for which data is to be generated, print data (specifically, a so-called PRN file or PS file) for printing out the user data, which is displayed by a task which manages a window corresponding to the management information on the object for which data is to be generated, to a designated output-location printing device is generated by using a printing process program included in the application software corresponding to the object for which data is to be generated.

Specifically, the file output is designated, the user data, which is an object to be printed, and an output-location file are designated, and the printing process program of the corresponding application software is called, thereby creating print data, which prints out the user data to the designated output-location printing device, in the designated output-location file. Further, in the process S430, since the file output is designated, the process S127 is performed in the printing process (refer to FIG. 5) performed in the process S430.

Thereafter, the task Z reads out the print data file-outputted from the hard disc device 23 by the printing process in the process S430 and converts the print data to print preview image data (S440). Specifically, when the print data is converted to the print preview image data, a color space may be converted to an RGB color space or the resolution may be converted to a resolution for print preview.

As such, when the print preview image data is generated, the task Z completes the data creating process under a state in which the print preview image data is stored in the RAM 15.

When the data creating process is completed in the process S340, the task Z determines whether or not print preview image data has been generated by the data creating process in the process S340 (S350), and when determined that the print preview image data is not generated (No in the process S350), the corresponding operation is completed.

On the other hand, when determined that the print preview image data has been generated by the data creating process (Yes in the process S350), the preview screen GP1 based on the print preview image data is displayed within a display screen G2 (S360). In addition, in the preview screen GP1 (refer to FIG. 9), a character string included in the window title information indicated by the management information of the object for which data is to be generated is displayed on the upper side of the preview screen GP1, a print button having a GUI (graphic user interface) format and a setting change button are displayed below the character string, and an image (that is, a print output result with respect to user data dealt with in a window corresponding to management information on the object for which data is to be generated) based on the print preview image data is displayed below the print button and the setting change button.

Figure 11:
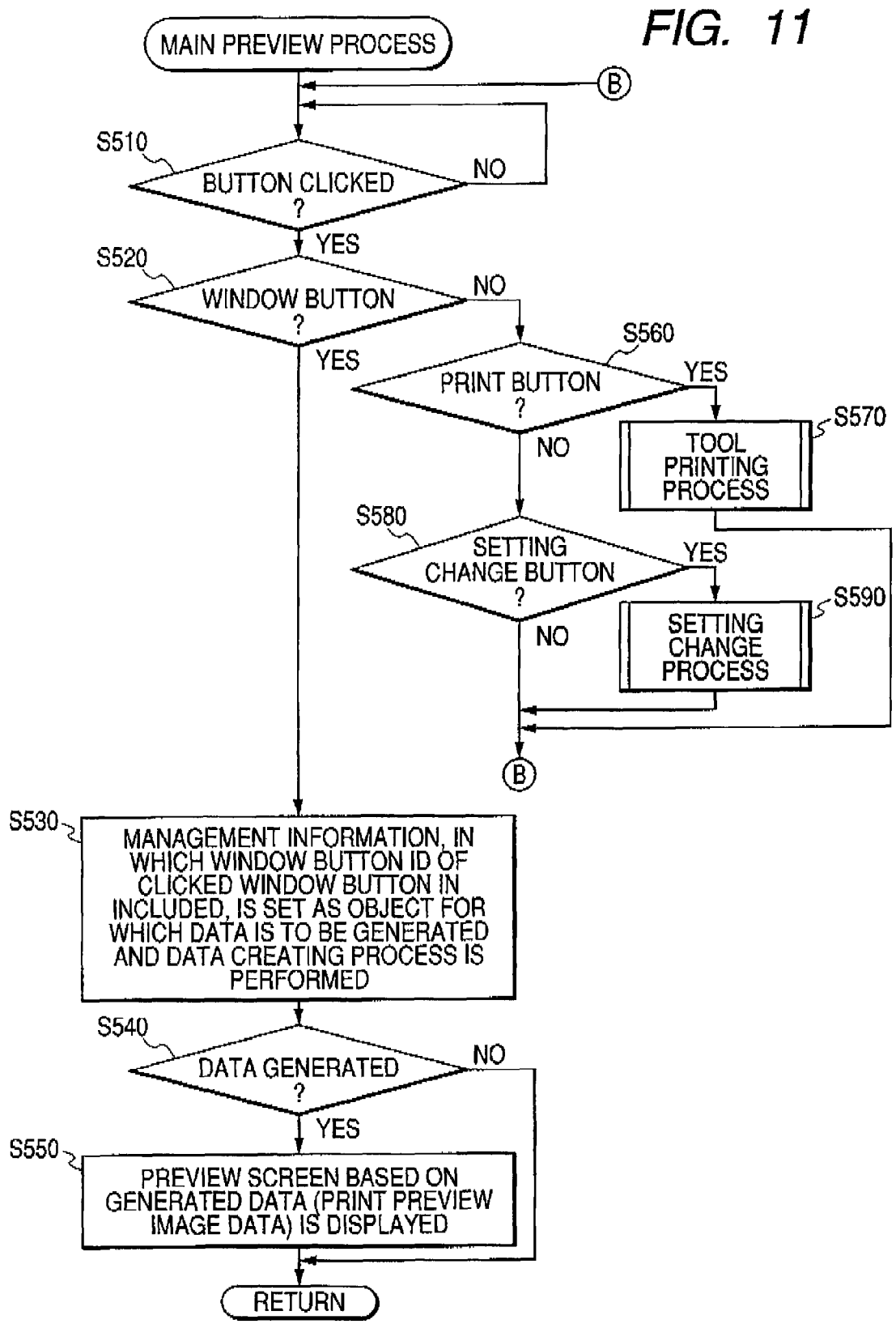
FIG. 11 is a flow chart illustrating a main preview process performed by the CPU.

When the process S360 is completed, the task Z completes the corresponding operation and then repeats a main preview process. FIG. 11 is a flow chart illustrating the main preview process performed by the task Z.

When the main preview process is performed, the task Z waits until a user clicks a button (window button or print button or setting change button) within the main screen GM through the input device 19 (S510), and then when the button is clicked (Yes in the process 3510), the task Z determines whether or not the clicked button is a window button (S520).

Then, when the clicked button is determined to be a window button (Yes in the process S520), the task Z sets the management information, which includes a window button ID corresponding to the window button, to an object for which data is to be generated, designates a printing device indicated by standard output-location information as the output-location printing device which is a printing device designated by a user, and performs the data creating process (S530).

When the data creating process is completed, the task Z proceeds to a process S540 in which it is determined whether or not print preview image data with respect to user data dealt with in a window corresponding to the management information on the object to be subjected to the preview process has been generated in the data creating process. Then, when determined that the print preview image data is not generated (No in the process S540), the corresponding main preview process is completed, and when determined that the print preview image data has been generated (Yes in the process S540), the task Z proceeds to a process S550.

In the process S550, the task Z displays, on the main screen GM, the preview screen GP1 showing an image based on the print preview image data generated by the data creating process in the process S530.

For example, when a user clicks a window button of "D1" displayed on the main screen GM through the input device 19, print preview image data corresponding to the user data D1 is generated (S530), and the preview screen GP1 based on the print preview image data corresponding to the user data D1 is displayed on the main screen GM together with a preview screen being displayed is deleted (S550). Then, the corresponding main preview process is completed.

Figure 12:
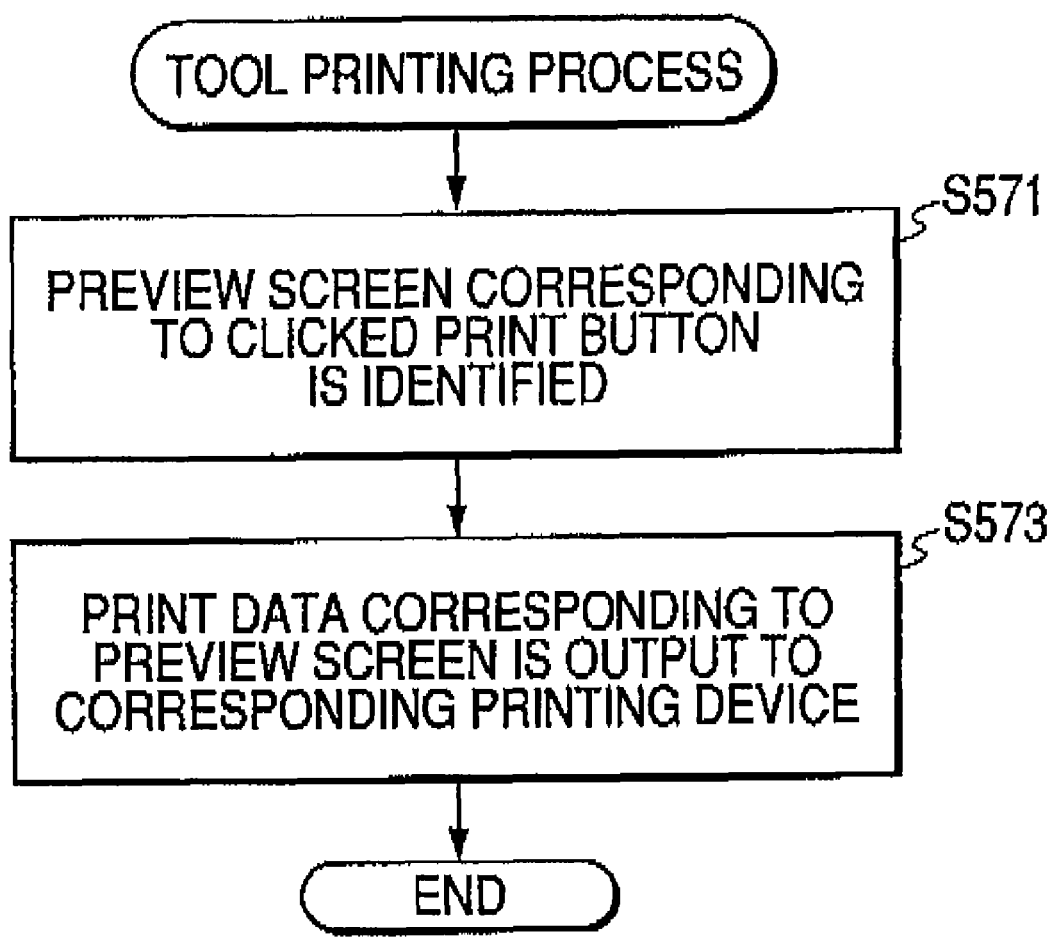
FIG. 12 is a flow chart illustrating a tool printing process performed by the CPU.

On the other hand, when determined that the clicked button is not a window button (No in the process S520), the task Z determines whether or not the clicked button is a print button (S560). When the clicked button is determined to be a print button (Yes in the process S560), the task Z performs a tool printing process shown in FIG. 12 in a process S570. FIG. 12 is a flow chart illustrating a tool printing process.

When the tool printing process is performed, the task Z identifies the preview screens GP1 and GP2 corresponding to the clicked print button (S571) and outputs the print data (print data used when a preview screen is generated) corresponding to the preview screens GP1 and GP2 to corresponding printing device (output-location printing device when print data is generated) (S573). Thereafter, the corresponding tool printing process is completed and the task Z waits until a button is clicked again (S510).

Figure 13:
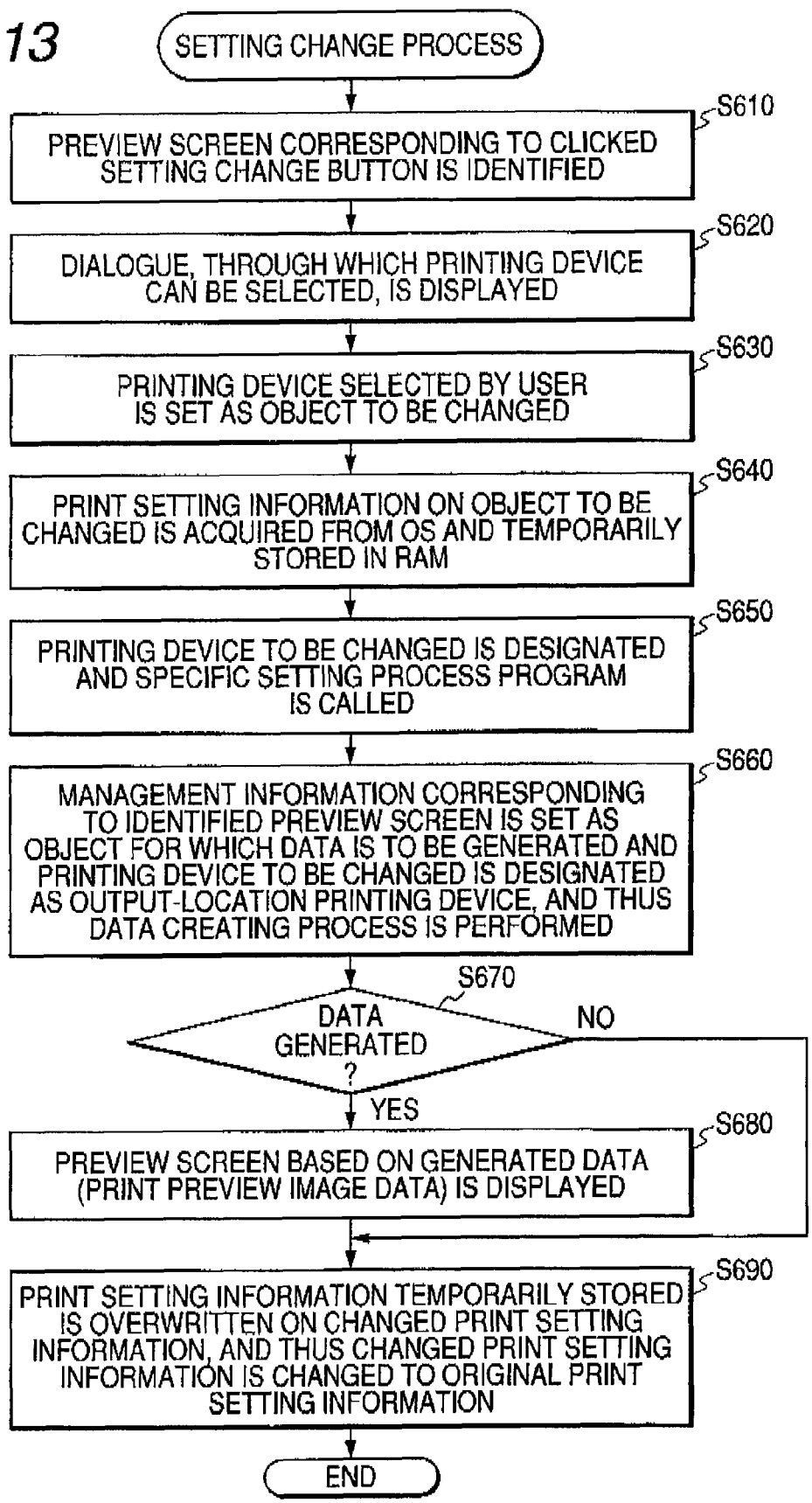
FIG. 13 is a flow chart illustrating a setting change process performed by the CPU.
Figure 14:
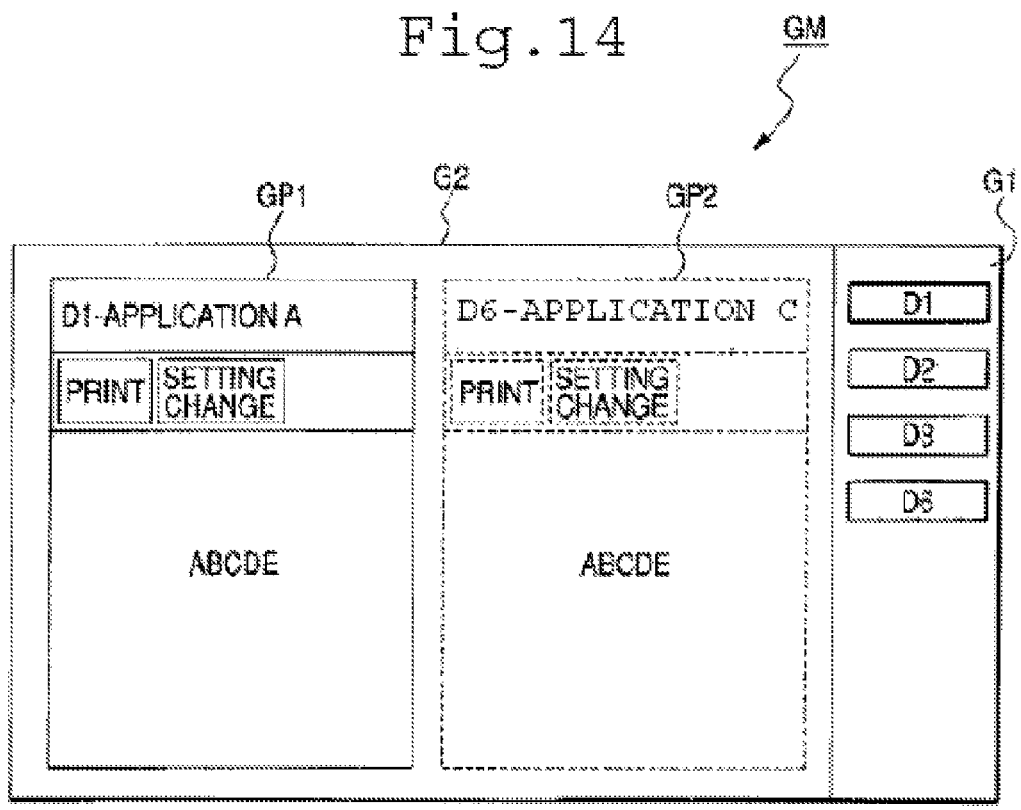
FIG. 14 is an explanatory view illustrating the configuration of the main screen depicting preview images of data corresponding to two different applications.

On the other hand, in the process S560, when determined that the clicked button is not a print button (No in the process 3560), the task z determines whether or not the clicked button is a setting change button (S580). If the clicked button is not a setting change button (No in the process S580), the task Z proceeds to the process S510, and if the clicked button is a setting change button (Yes in the process S580), the task Z performs a setting change process (S590) shown in FIG. 13. FIG. 13 is a flow chart illustrating the setting change process.

In the setting change process, the task Z identifies the preview screens GP1 and GP2 corresponding to the clicked setting change button (S610) and displays a setting change dialogue through which one of the printing devices Pr1, Pr2, and Pr3 connected to the information processing apparatus 1 can be selected (S620). Then, the task Z waits until a user's operation for selecting a printing device by using the setting change dialogue is completed, and when the selection operation is completed, the printing device, which has been selected by the user through the setting change dialogue, is set as a printing device to be changed (S630). Then, print setting information corresponding to the printing device to be changed is acquired from the multi-task OS and the print setting information is temporarily stored in the RAM 15 (S640).

When the process S640 is completed, since a specific setting dialogue with respect to the printing device to be changed is displayed, the task Z designates a printing device to be changed and calls a specific setting process program (S650). Accordingly, on the display device 17, the specific setting dialogue, through which it is possible to perform a setting on a printing method with respect to the printing device to be changed, is displayed (S111). Further, when the user's setting operation using the specific setting dialogue is completed (Yes in the process S113), the print setting information of the printing device to be changed is updated according to the user's setting operation.

When the process performed by the specific setting process program is completed, the task z proceeds to a process S660. In the process S660, the task Z sets the management information corresponding to the preview screens GP1 and GP2 identified in the process S610 to an object for which data is to be generated and designates the printing device to be changed as an output-location printing device, and thus a data creating process is performed.

Accordingly, in the data creating process, print data for printing out the user data corresponding to the object for which data is to be generated to the printing device to be changed by using a printing method specified by the user in the process S650 is generated (S430), and print preview image data based on the print data is generated (S440).

When the process S660 is completed, the task Z determines whether or not the print preview image data has been generated by the data creating process in the process S660 (3670). When determined that the print preview image data is not generated (No in the process S670), the task Z proceeds to a process S690 without additionally displaying the preview screen GP2.

On the other hand, when determined that the print preview image data has been generated (Yes in the process S670), the preview screen GP2 (refer to a dotted line shown in FIG. 9) based on the print preview image data is displayed on the display screen G2 together with the preview screen being displayed (S680). In addition, a character string included in the window title information, which is indicated by the management information of the object for which data is to be generated, and a character string (for example, character string displayed as "another setting") indicating a preview screen after a setting has been changed are displayed on the upper side of the preview screen GP2, a print button having a GUI format and a setting change button are displayed below the character strings, and an image (a print output result after the setting has been changed) based on the print preview image data is displayed below the print button and the setting change button.

When the process S680 is completed, the task Z proceeds to a process 3690. In the process S690, the task Z overwrites print setting information with respect to the printing device to be changed, which is temporarily stored in the RAM 15 in the process S640, on print setting information which has been changed in the process S115 by performing the specific setting process in the process S650, changes the print setting information which has been changed in the process S115 to original print setting information (S690), and then completes the corresponding setting change process.

Hereinabove, the information processing apparatus 1 according to the illustrative aspect has been described. When a print instruction is input from the input device 19i serving as an operation unit, through a window of application software, the information processing apparatus 1 generates the print data for printing an image based on designated user data (user data displayed on a window for which the print instruction has been input) in the printing device designated through the printing device setting dialogue, in a printing method indicated by the print setting information by using the printing process program (refer to FIG. 5) of the application software (S109 and S123), and then the print data is input to the designated printing device so as to make the printing device print out the designated user data (S129).

Further, when an instruction to perform a print preview function is input by a user's clicking operation on a window button (Yes in the process S520), the information processing apparatus 1 generates print data for printing out user data corresponding to the window button to a standard printing devices serving as a printing device designated with the instruction, by using a printing process program of application software corresponding to the clicked window button (S530 and S123), and then print preview image data showing the print output result obtained when the user data is printed out by the standard printing device is generated on the basis of the print data (S530). Then, an image (preview screen GP1) based on the print preview image data generated in the process S530 is displayed on the display device 17 (S550).

In addition, when an instruction to change the printing device is input from the input device 19 by a user's clicking operation on a setting change button displayed on the preview screen GP1, the information processing apparatus 1 generates print preview image data in a case in which the same user data as that used when the preview screen GP1 is generated in the printing device designated through the setting change dialogue is printed out in the printing method specified in the process S650 (S660). Then, an image (preview screen GP2)

based on the print preview image data is displayed on the display device 17 in parallel to the preview screen GP1.

According to the information processing apparatus 1, in a case in which one data is printed out through each of the plurality of printing devices Pr1, Pr2, and Pr3, a user can simultaneously check the print output results on the preview screens GP1 and GP2 That is, according to the illustrative aspect, since the user can easily compare the print output results of the different printing devices Pr1, Pr2, and Pr3, the user can select a proper printing device so as to make the printing device perform a printing operation.

Further, in the illustrative aspect, even though a dialogue through which a printing device can be selected or a dialogue through which print setting information can be updated is not displayed when a window button is clicked, the user can designate a predetermined printing device and a printing method when clicking a window button by updating standard output-location information or updating print setting information in advance before clicking the window button.

Furthermore, according to the information processing apparatus 1, since the user can check, through a screen of the display device, the print output results in the case in which one data is printed out through different printing devices, and set a printing method for each printing device, the user can compare the print output results under different conditions in detail. As such, according to the illustrative aspect, the user can select a proper printing device and then print out desired data through the selected printing device by using a proper printing method.

In addition, in the illustrative aspect, a print processing unit of the invention is realized by the printing process shown in FIG. 5, a first image data generating unit is realized by the process S530, and a first preview unit is realized by the process S550. In addition, a second image data generating unit is realized by the process S660, and a second preview unit is realized by the process 5680.

In addition, the information processing apparatus and the program of the invention are not limited to the illustrative aspect described above, but may be realized in various ways.

Further, in the illustrative aspect, a dedicated tool for print preview (preview tool) is prepared separately from application software, such as word processor software or drawing software, and the preview screens showing the print output results under the different conditions are displayed at the same time by using the preview tool. However, for example, the functions of the invention may not be performed by the dedicated tool but may be included in the print preview function of the word processor software or the drawing software.

As described in detail with reference to the illustrative aspects, there is provided following configurations.

(1) An information processing apparatus having a print preview function, including: a print processing unit that, when a print instruction is input from an operation unit that a user operates, controls a printing device to print an image based on data and printing method that are designated with the print instruction; a first image data generating unit that, when an instruction to execute a print preview function is input from the operation unit, generates a first print preview image data that shows a print output result obtained when the print processing unit controls the printing device to print an image based on data and a first printing method designated with the execution instruction; a first preview unit that displays, on a display device, an image based on the first print preview image data generated by the first image data generating unit; a second image data generating unit that, when an instruction to change a printing method is input from the operation unit while the image is displayed by the first preview unit, generates a second print preview image data that shows a print output result obtained when the print processing unit controls the printing device to print an image based on the data designated with the execution instruction for generating the first print preview image data with respect to the image being displayed, and based on a second printing method designated with the change instruction; and a second preview unit that displays, on the display device, an image based on the second print preview image data generated by the second image data generating unit in parallel to the image based on the first print preview image data.

(2) An information processing apparatus having a print preview function, including: a print processing unit that, when a print instruction is input from an operation unit that a user operates, controls a printing device designated with the print instruction to print an image based on data designated with the print instruction; a first image data generating unit that, when an instruction to execute a print preview function is input from the operation unit, generates a first print preview image data that shows a print output result obtained when the print processing unit controls the printing device designated with the execution instruction to print an image based on data designated with the execution instruction; a first preview unit that displays, on a display device, an image based on the first print preview image data generated by the first image data generating unit; a second image data generating unit that, when an instruction to change a printing device is input from the operation unit while the image is displayed by the first preview unit, generates a second print preview image data that shows a print output result obtained when the print processing unit controls the printing device designated with the change instruction to print an image based on the data designated with the execution instruction for generating the first print preview image data with respect to the image being displayed; and a second preview unit that displays, on the display device, an image based on the second print preview image data generated by the second image data generating unit in parallel to the image based on the first print preview image data.

(3) The information processing apparatus according to (2) wherein when the print instruction is input, the print processing unit controls the printing device designated with the print instruction to print the image based on data designated with the print instruction based on a first printing method designated with the print instruction, wherein when the instruction to execute the print preview function is input from the operation unit, the first image data generating unit generates the first print preview image data that shows the print output result obtained when the print processing unit controls the printing device designated with the execution instruction to print the image based on the data designated with the execution instruction, based on the first printing method designated with the print instruction, and wherein when the instruction to change the printing device is input while the image is displayed by the first preview unit, the second image data generating unit generates the second print preview image data that shows the print output result obtained when the print processing unit controls the printing device designated with the change instruction to print the image based on the data designated with the execution instruction for generating the first print preview image data with respect to the image being displayed, (4) A computer-readable program product for causing a computer having a print processing unit that, when a print instruction is input from an operation unit that a user operates, controls a printing device to print an image based on data and printing method that are designated with the print instruction, to perform procedures including: generating, when an instruction to execute a print preview function is input from the operation unit, a first print preview image data that shows a print output result obtained when the print processing unit controls the printing device to print an image based on data and a first printing method designated with the execution instruction; displaying, on a display device, an image based on the first print preview image data; generating, when an instruction to change a printing method is input from the operation unit while the image based on the first print preview image data is displayed, a second print preview image data that shows a print output result obtained when the print processing unit controls the printing device to print an image based on the data designated with the execution instruction for generating the first print preview image data with respect to the image being displayed, and based on a second printing method designated with the change instruction; and displaying, on the display device, an image based on the second print preview image data in parallel to the image based on the first print preview image data.

(5) A computer-readable program product for causing a computer having a print processing unit that, when a print instruction is input from an operation unit that a user operates, controls a printing device designated with the print instruction to print an image based on data designated with the print instruction, to perform procedures including: generating, when an instruction to execute a print preview function is input from the operation unit, a first print preview image data that shows a print output result obtained when the print processing unit controls the printing device designated with the execution instruction to print an image based on data designated with the execution instruction; displaying, on a display device, an image based on the first print preview image data; generating, when an instruction to change a printing device is input from the operation unit while the image based on the first print preview image data is displayed, a second print preview image data that shows a print output result obtained when the print processing unit controls the printing device designated with the change instruction to print an image based on the data designated with the execution instruction for generating the first print preview image data with respect to the image being displayed; and displaying, on the display device, an image based on the second print preview image data in parallel to the image based on the first print preview image data.

According to the configurations of (1) and (4), when the instruction to change the printing method is input while a preview image (image based on print preview image data) is displayed, a preview screen corresponding to the printing method designated at the time of the change instruction is displayed in parallel to the preview screen being displayed. Accordingly, with respect to one data, a user can easily compare print output results under different conditions through a display device. As a result, a user can make the printing device print data by using a proper printing method.

According to the configurations of (2) and (5), a user can check the print output results, which will be obtained when one data is printed out by a plurality of printing devices, on a preview screen at the same time. That is, since the user can easily compare the print output results of different printing devices, the user can select a proper printing device and make the selected printing device perform a print output.

According to the configuration of (3), since a user can check the print output results, which will be obtained when one data is printed out by different printing devices, through a screen of a display device and set a printing method of each printing device, the user can compare the print output results under different conditions even more specifically. As such, the user can select a proper printing device and make the selected printing device print out desired data by using a proper printing method.

The foregoing description of the illustrative aspect has been presented for purposes of illustration and description. It is not intended to be exhaustive or to limit the invention to the precise form disclosed, and modifications and variations are possible in light of the above teachings or may be acquired from practice of the invention. The illustrative aspect was chosen and described in order to explain the principles of the invention and its practical application program to enable one skilled in the art to utilize the invention in various illustrative aspects and with various modifications as are suited to the particular use contemplated. It is intended that the scope of the invention be defined by the claims appended hereto, and their equivalents.

What is claimed is:

1. An information processing apparatus managed by a multi-task operating system which displays a plurality of windows for displaying information on a display device, the information processing apparatus comprising:
   an operation unit that allows a user to input instructions;
   a print processing unit that controls a printing device to print an image based on data that is designated with a print instruction input through the operation unit;
   a first acquiring unit that acquires a window handle for each of the plurality of windows displayed on the display device, in response to a print preview instruction input through the operation unit, the window handles including a first window handle for a first window which has been generated by a task based on a first application software dealing with first user data and a second window handle for a second window which has been generated by a task based on a second application software dealing with second user data;
   a second acquiring unit that acquires, for each of the plurality of windows identified by the window handles, application identification information for identifying an application software corresponding to a task of displaying information in each of the windows;
   an application registering unit that registers at least two application software including the first application software and the second application software;
   a window registering unit that selects windows corresponding to the at least one application software registered by the application registering unit, from among the plurality of windows identified by the window handles based on the application identification information acquired for each of the windows, and that registers the window handles for the selected windows,
   wherein each of the plurality of windows is a display configured to be activated by clicking itself;
   an operation screen display unit that displays, on the display device, an operation screen indicating the windows identified by the window handles registered by the window registering unit, for selecting one of the windows in the operation screen as a preview object;
   a first image data generating unit that, in response to the print preview instruction, generates a first print preview image data that shows a print output result obtained when the print processing unit controls the printing device to print an image based on data displayed on the first window based on the first application software;
   a first preview unit that displays a first preview image based on the first print preview image data of the first window based on the first application software in a print preview window on the display device, wherein the first preview unit displays a first setting change button configured to change the first preview image displayed by the first preview unit when clicked;

a second image data generating unit that, while the first preview image of the first window based on the first application software is displayed in the print preview window, in response to selecting the second window from among the windows identified by the window identification information registered by the window registering unit as the preview object through the operation screen, generates a second print preview image data that shows a print output result obtained when the print processing unit controls the printing device to print an image based on data displayed on the second window which is based on the second application software and is selected as the preview object; and a second preview unit that displays a second preview image based on the second print preview image data of the second window based on the second application software in the print preview window on the display device while the first preview image of the first window based on the first application software is displayed in the print preview window, wherein the second preview unit displays a second setting change button configured to change the second preview image displayed by the second preview unit when clicked.

2. The information processing apparatus according to claim 1, wherein the first image data generating unit generates the first print preview image data based on the data displayed on a window which has been active immediately before the preview instruction is input.

3. The information processing apparatus according to claim 1, wherein the print processing unit controls the printing device to print an image based on a data that is designated with a print instruction, according to a printing method that is designated with the print instruction, and wherein the first image data generating unit and the second image data generating unit generate the print preview image data that shows a print output result obtained when the print processing unit controls the printing device to print an image displayed on a window according to a preset printing method, the information processing apparatus further comprising:

a third image data generating unit that, in response to a method-change instruction to a preview image displayed in the print preview window, generates a third print preview image data that shows a print output result obtained when the print processing unit controls the printing device to print an image based on data used in generating the print preview image data as an object of the method-change instruction, according to a printing method that is designated with the method-change instruction; and a third preview unit that displays a third preview image based on the third print preview image data in the print preview window on the display device together with a preview image which has been displayed therein.

4. The information processing apparatus according to claim 1, wherein the print processing unit controls a printing device that is designated with a print instruction to print an image based on a data that is designated with the print instruction, and wherein the first image data generating unit and the second image data generating unit generate the print preview image data that shows a print output result obtained when the print processing unit controls a preset printing device to print an image displayed on a window, the information processing apparatus further comprising:

a third image data generating unit that, in response to a device-change instruction to a preview image displayed in the print preview window, generates a third print preview image data that shows a print output result obtained when the print processing unit controls a printing device that is designated with the device-change to print an image based on data used in generating the print preview image data as an object of the device-change instruction; and a third preview unit that displays a third preview image based on the third print preview image data in the print preview window on the display device together with a preview image which has been displayed therein.

5. The information processing apparatus according to claim 1, wherein the operation screen control unit displays the operation screen in a predetermined area of the print preview window.

6. The information processing apparatus according to claim 1, wherein the second preview unit displays the second preview image based on the second print preview image together with the first preview image based on the first print preview image data.

7. The information processing apparatus according to claim 1, further comprising:

an assigning unit that assigns button identification information for each of the windows registered by the registration unit, wherein the operation screen display unit displays the operation screen which includes a button identified by each of the button identification information, and wherein the preview object is selected based on the button displayed on the operation screen.

8. The information processing apparatus according to claim 1, wherein the application registering unit displays a list of application softwares corresponding to the plurality of windows displayed on the display device when the print preview instruction is input, and wherein the application registering unit registers the at least one application software from the list based on an input instruction through the operation unit.

9. A non-transitory computer-readable medium having a computer program stored thereon and configured to be readable by a computer, the computer being managed by a multi-task operation system which displays a plurality of windows for displaying information on a display device and including an operation unit that allows a user to input instructions, the computer program, when executed by the computer, causing the computer to perform operations comprising:

controlling a printing device to print an image based on data that is designated with a print instruction input through the operation unit;

acquiring a window handle for each of the plurality of windows displayed on the display device, in response to a print preview instruction input through the operation unit, the window handles including a first window handle for a first window which has been generated by a task based on a first application software dealing with first user data and a second window handle for a second window which has been generated by a task based on a second application software dealing with second user data;

acquiring, for each of the plurality of windows identified by the window handles, application identification information for identifying an application software corresponding to a task of displaying information in each of the windows;

registering at least two application software including the first application software and the second application software;

registering windows, by selecting windows corresponding to the at least one of registered application software registered during the registering at least two application software step, from among the plurality of windows identified by the window handles based on the application identification information acquired for each of the windows, wherein each of the plurality of windows is a display configured to be activated by clicking itself;

registering the window handles, for the selected windows registered in the registering windows step;

displaying, on the display device, an operation screen indicating the windows identified by the window handles registered in the registering the window identification information step, for selecting one of the windows in the operation screen as a preview object;

in response to a print preview instruction, generating a first print preview image data that shows a print output result obtained when the print processing unit controls the printing device to print an image based on data displayed on the first window based on the first application software;

displaying a first preview image based on the first print preview image data of the first window based on the first application software and a first setting change button configured to change the first preview image in a print preview window on the display device;

while the first preview image of the first window based on the first application software is displayed in the print preview window, in response to selecting the second window, from among the windows identified by the window identification information registered in the registering the window identification information step, as the preview object through the operation screen, generating a second print preview image data that shows a print output result obtained when the print processing unit controls the printing device to print an image based on data displayed on the second window which is based on the second application software and is selected as the preview object; and displaying a second preview image based on the second print preview image data of the second window based on the second application software and a second setting change button configured to change the second preview image in the print preview window on the display device while the first preview image of the first window based on the first application software is displayed in the print preview window.

* * * * *